(12) United States Patent
Han

(10) Patent No.: US 10,347,204 B2
(45) Date of Patent: Jul. 9, 2019

(54) DUMMY CIRCUIT AND DRIVE CIRCUIT FOR FLAT PANEL DISPLAY DEVICE

(71) Applicant: Wuhan China Star Optoelectronics Technology Co., Ltd., Wuhan, Hubei (CN)

(72) Inventor: Yuebai Han, Hubei (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 0 days.

(21) Appl. No.: 15/577,876

(22) PCT Filed: Oct. 24, 2017

(86) PCT No.: PCT/CN2017/107545
§ 371 (c)(1),
(2) Date: Nov. 29, 2017

(87) PCT Pub. No.: WO2019/056465
PCT Pub. Date: Mar. 28, 2019

(65) Prior Publication Data
US 2019/0096345 A1    Mar. 28, 2019

(30) Foreign Application Priority Data
Sep. 25, 2017 (CN) .......................... 2017 1 0875956

(51) Int. Cl.
*G09G 3/36* (2006.01)
(52) U.S. Cl.
CPC ... *G09G 3/3648* (2013.01); *G09G 2300/0413* (2013.01); *G09G 2300/0426* (2013.01); *G09G 2320/0233* (2013.01)

(58) Field of Classification Search
CPC .. G09G 3/3225; G09G 3/3266; G09G 3/3275; G09G 3/3648; G09G 3/3674–3692; G09G 2300/0413; G09G 2300/0426; G09G 2320/0233
See application file for complete search history.

(56) References Cited

U.S. PATENT DOCUMENTS

| | | | | |
|---|---|---|---|---|
| 2010/0327955 | A1* | 12/2010 | Umezaki | G09G 3/20 327/520 |
| 2013/0321251 | A1* | 12/2013 | Kang | G09G 3/36 345/87 |
| 2017/0060310 | A1* | 3/2017 | Gwon | G06F 3/0412 |

* cited by examiner

*Primary Examiner* — Nathan Danielsen
(74) *Attorney, Agent, or Firm* — Hauptman Ham, LLP

(57) ABSTRACT

A dummy circuit and a driving circuit of a flat panel display device is provided in the present application, including: a plurality of dummy scanning lines extending in a row direction and separated from each other; a plurality of data lines extending in a column direction and separated from each other, the plurality of data lines including an outer dummy data line in the outermost side; the dummy scanning lines intersecting with the dummy data lines to form a plurality of dummy pixel regions, dummy pixel electrodes provided in the dummy pixel regions; a plurality of thin film transistors connecting the pixel electrode to the corresponding dummy scanning lines and the dummy data lines; and wherein the outer dummy data line corresponding to at least one end portion of the of the dummy scanning line outwardly avoidance disposed to make the projections of the both staggered.

16 Claims, 3 Drawing Sheets

DUMMY CIRCUIT AND DRIVE CIRCUIT FOR FLAT PANEL DISPLAY DEVICE

RELATED APPLICATIONS

The present application is a National Phase of International Application Number PCT/CN2017/107545, filed Oct. 24, 2017, and claims the priority of China Application No. 201710875956.X, filed Sep. 25, 2017.

FIELD OF THE DISCLOSURE

The disclosure relates to a flat panel display technical field, and more particularly to a dummy circuit and a drive circuit for a flat panel display device.

BACKGROUND

With the continuous development of liquid crystal technology and other flat panel display technology, the application of flat panel display devices in people's daily production and life is more and more widely.

In the present design of the flat panel display device, in order to improve the uniformity of the active area, AA of the flat panel display device, a dummy circuit is usually constructed in the peripheral area of the flat panel display device. Referring to FIG. 1, the dummy circuit includes a plurality of dummy scanning lines DS1', ..., DSm', a plurality of dummy data lines DD1', ..., DDn', and a plurality of thin film transistors, the dummy scanning lines and the dummy scanning lines intersecting to form a plurality of pixel regions, the pixel regions include dummy pixel electrodes. In order to make the steps such as exposure and etching more uniform, there is an outer dummy data line DDn' in the dummy data lines, the outer dummy data line DDn' is the outermost dummy data line (the AA area is defined as the inner side, away from the AA area is defined as the outer side, and is the rightmost dummy data line in FIG. 1), the projections of all the dummy scanning lines DS1', ..., DSm' intersect with the outer dummy data line DDn' in the horizontal plane, that is, the distance between the projection of the dummy scanning lines DS1', ..., DSm' and the outer dummy data line DDn' in the horizontal plane is 0, and the right end of the dummy scanning lines extends rightwardly (or outwardly) beyond the outer dummy data line. Since the density of the metal film in the edge region of the panel is relatively large, a large amount of static electricity easily occurs during the manufacturing process. Since the end portions (the right end) of the dummy scanning lines DS1', ..., DSm' are pointed ends, a large amount of static electricity is accumulated to the end portion of the dummy scanning lines, and a portion of the dummy scanning line not far from the end portion overlaps with the outer dummy data line DDn', so that the insulating layers between the dummy scanning lines DS1', ... DSm' and the outer dummy data line DDn' may easily be damaged when the end portions of the dummy scanning lines DS1'. .., DSm' are performing electrostatic discharge, as a result, the dummy scanning lines DS1', ..., DSm' and the outer dummy data line DDn' are short, causing abnormalities such as vertical bright lines or poor display.

SUMMARY

A technical problem to be solved by the embodiment of the present invention is to provide a dummy circuit and a driving circuit for a flat panel display device. It can improve the short problem of the dummy scanning lines and an external data line.

In order to solve the above technical problem, a first aspect of the present invention provides a dummy circuit for a flat panel display device, including:

A plurality of dummy scanning lines extending in a row direction and separated from each other;

A plurality of data lines extending in a column direction and separated from each other, the plurality of data lines including an outer dummy data line in the outermost side; the dummy scanning lines intersecting with the dummy data lines to form a plurality of dummy pixel regions, dummy pixel electrodes provided in the dummy pixel regions;

A plurality of thin film transistors connecting the pixel electrode to the corresponding dummy scanning lines and the dummy data lines; and Wherein the outer dummy data line corresponding to at least one end portion of the of the dummy scanning line is outwardly avoidance disposed to make the projections of the both staggered.

Wherein the outer dummy data line includes a longitudinal portion and an avoidance portion, the longitudinal portion is connected to the avoidance portion, and the avoidance portion is located on the outer side of the longitudinal portion.

Wherein the avoidance portion is a fold line bent outwardly.

Wherein the avoidance portion is a curved portion bent outwardly.

Wherein with projection in the horizontal plane, a shortest distance between the avoidance portion and the end portion of the corresponding scanning line is in the range of 5 μm to 15 μm.

Wherein the outer dummy data line corresponding to all of end portions of the dummy scanning lines are outwardly avoidance disposed.

Wherein the outer dummy data line corresponding to all of end portions of the dummy scanning lines are outwardly avoidance disposed.

Wherein an insulating layer is disposed between the dummy scanning line and the dummy data line.

Wherein end portions of the dummy scanning lines are pointed ends.

Wherein the thin film transistors are LTPS-based thin film transistor.

A second aspect of the present invention provides a driving circuit of a flat panel display device, including a dummy circuit of a flat panel display device, including the dummy circuit of the flat panel display device described above.

The embodiment of the present invention has the following advantageous effects:

Since the plurality of the dummy data lines includes an outermost outer dummy data line, the outer dummy data line corresponding to at least one end portion of the of the dummy scanning line is outwardly avoidance disposed to make the projections of the both are staggered. Thus, there is a gap between the outer dummy data line and the corresponding dummy scanning line at the horizontal plane, and there is no overlap between the two, even if a large amount of static electricity is accumulated at the end portion of the corresponding dummy scanning line, the outer dummy data line and the corresponding dummy scanning line are not easy to be shorted, so that it is not easy to cause an abnormality such as a vertical bright line or a dark display.

BRIEF DESCRIPTION OF THE DRAWINGS

Accompanying drawings are for providing further understanding of embodiments of the disclosure. The drawings form a part of the disclosure and are for illustrating the principle of the embodiments of the disclosure along with the literal description. Apparently, the drawings in the description below are merely some embodiments of the disclosure, a person skilled in the art can obtain other drawings according to these drawings without creative efforts. In the FIGS..

DETAILED DESCRIPTION OF PREFERRED EMBODIMENTS

The technical solutions in the embodiments of the present invention will be described clearly and completely hereinafter with reference to the accompanying drawings in the embodiments of the present invention. Apparently, the described embodiments are merely some but not all of the embodiments of the present invention. All other embodiments obtained by persons of ordinary skill in the art based on the embodiments of the present invention without creative efforts shall fall within the protection scope of the present invention.

The terms "comprising" and "having," as well as any variations thereof, appearing in the specification, claims and drawings, are intended to cover the inclusion of non-exclusive. For example, a process, method, system, product, or device that incorporates a series of steps or units is not limited to the steps or units listed but may optionally further include steps or units not listed or may optionally further include Other steps or units inherent to these processes, methods, products or devices. In addition, the terms "first", "second" and "third" are used to distinguish different objects and are not intended to describe a specific order.

First Embodiment

Figure 1:
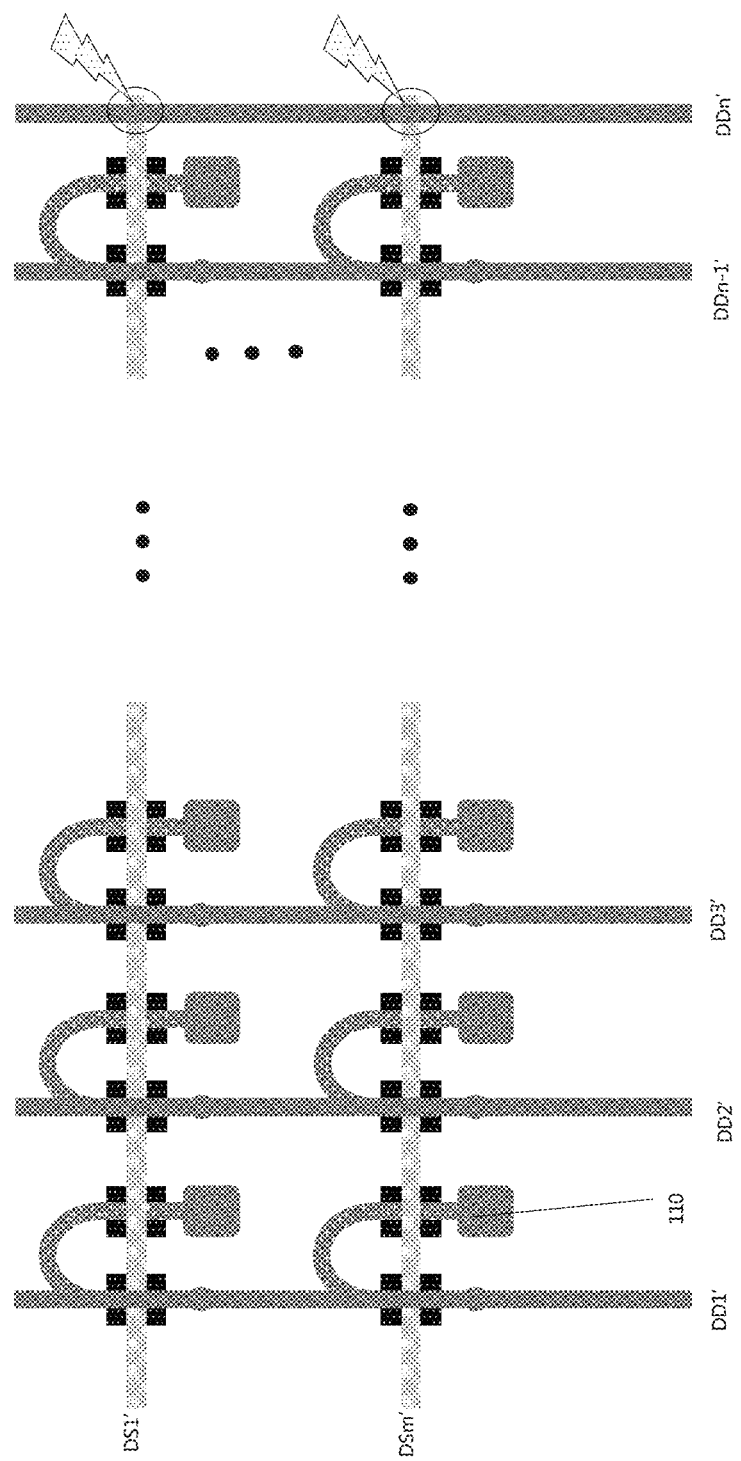
FIG. 1 is a schematic diagram of a dummy circuit of a flat panel display device of the conventional technology.
Figure 2:
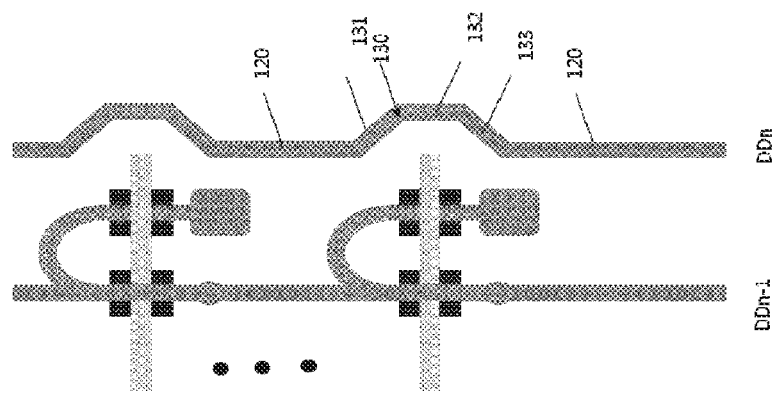
FIG. 2 is a schematic diagram of the dummy circuit of a flat panel display device according to a first embodiment of the present invention.
Figure 2:
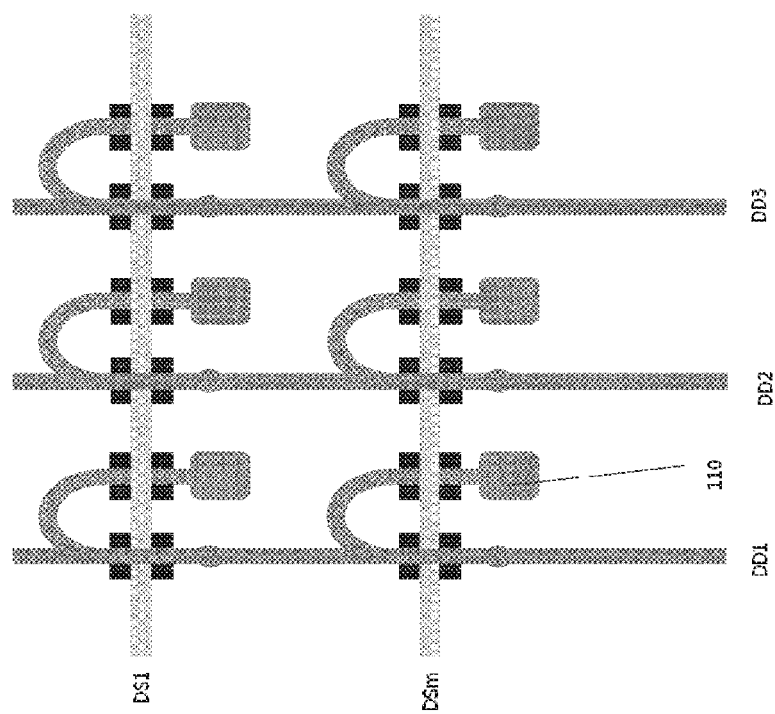

The embodiment of the present invention provides a dummy circuit of a flat panel display device; the flat panel display device is such as a liquid crystal display device. The flat panel display device includes an active area and a peripheral area surrounding the active area. In the present embodiment, one end closes to the active area is defined as an inner end, and one end away from the active area is defined as an end portion. A charging circuit is provided in the active area, wherein the charging circuit includes a plurality of scanning lines and a plurality of data lines, the scanning lines and the data lines intersect to form pixel regions, and the pixel regions are provided with pixel electrodes. A dummy circuit is provided in the peripheral area, the dummy circuit is disposed around the charging circuit. Referring to FIG. 2, the dummy circuit of the flat panel display device includes a plurality of dummy scanning lines DS1, . . . , DSM, a plurality of dummy data lines DD1, . . . , DDN, and a plurality of thin film transistors 110.

In the present embodiment, the plurality of dummy scanning lines DS1, . . . , DSm extend in the row direction and are parallel to each other, the number of the dummy scanning lines is M, wherein M is a positive integer greater than or equal to two. The inner ends (left end in FIG. 2) of the plurality of dummy scanning lines DS1, . . . , DSm are electrically connected to the scanning lines in the corresponding active area, that is, when the scanning lines in the active area are inputted a turn on voltage by the gate electrode driver, the corresponding dummy scanning lines are also inputted the turn on voltage. In the present embodiment, the right ends of the dummy scanning lines DS1, . . . , DSm are suspended and are with pointed ends, the specific pointed ends are hemispherical shape extending rightwardly, and of course the pointed ends can be other shapes, depending on the etching conditions in the process.

In the present embodiment, the plurality of the dummy data lines DD1, . . . , DDn extend in the column direction and are separated from each other, and the dummy data lines DD1, . . . , DDn intersect with the dummy scanning lines DS1, . . . , DSm to form a plurality of dummy pixel regions, dummy pixel electrodes are provided in the dummy pixel regions. In the present embodiment, the number of the dummy data lines DD1, . . . , DDn is N, wherein N is a positive integer greater than or equal to 2, and the N dummy data lines DD1, . . . , DDn are electrically connected to the source electrode driver, the source electrode driver may input a common voltage to the dummy data lines DD1, . . . , DDn so that the dummy pixel electrodes are charged with the common voltage. In the present embodiment, the outermost dummy data line is the outer dummy data line DDn, that is, the rightmost dummy data line is the outer dummy data line DDn. In the present embodiment, excepting the outer dummy data line DDn, the N−1 dummy data lines DD1, . . . , DDn−1 are parallel to each other and are cross setting with the dummy scanning lines DS1, . . . , DSm.

In the present embodiment, the thin film transistor 110 is located at the corner of the dummy pixel region, the gate electrode of the thin film transistor 110 is electrically connected to the corresponding dummy scanning line, the source electrode is electrically connected to the corresponding dummy data line, the drain electrode is electrically connected to the corresponding dummy pixel electrode. In the present embodiment, the outer dummy data line DDn is not electrically connected to the thin film transistor 110.

In order to improve the short issue of the dummy scanning line and the outer dummy data line in the conventional technology, in the present embodiment, an end portion of the outer dummy data line DDn corresponding to at least one of the dummy scanning line is outwardly avoidance disposed, so that the projections of the outer dummy data line DDn and the corresponding dummy scanning line in the horizontal plane are not crossed, the projections of two of them in the horizontal plane have a gap, that is, there is no overlap between two of them. In this embodiment, the right portion of the outer dummy data line DDn corresponding to the dummy scanning line is shifted to the right side to avoid overlapping with the dummy scanning line. Therefore, there is a gap between a horizontal projection of the outer dummy data line and the corresponding dummy scanning line, and there is no overlapping area therebetween. Even if a large amount of static electricity is accumulated on the end portion of the corresponding dummy scanning line, it is not easy short between the outer dummy data line and the corresponding dummy scanning line when the electrostatic is discharged, so that it is not easy to cause an abnormality such as a vertical bright line or a dark display.

In order to greatly reduce the short between the outer dummy data lines due to the electrostatic discharge of the end portion of the dummy scanning line, in the present embodiment, the outer dummy data line DDn correspond to all of the end portions of the dummy scanning lines DS1, . . . , DSm are outwardly avoidance disposed, so that the projections of the outer dummy data line DDn and all of the dummy scanning lines DS1, . . . , DSm in the horizontal plane are staggered. Therefore, all of the dummy scanning lines DS1, . . . , DSm are not easily short with the outer dummy data line DDn caused by the electrostatic discharge at their end portions. In addition, in other embodiments of the present invention, the outer dummy data line may also be outwardly avoidance disposed only to partial of the corresponding end portions of the portion of the outer dummy data line, that is, not all the portion of the outer dummy data line corresponding to the dummy scanning lines will be outwardly avoidance disposed.

In the present embodiment, the outer dummy data line DDn includes a longitudinal portion 120 and an avoidance portion 130. The longitudinal portion 120 is a vertically downward straight line, and the longitudinal portion 120 and the remaining N-1 dummy data lines DD1, . . . , DDn-1 are parallel to each other. The avoidance portion 130 is located on the outer side of the longitudinal portion 120, and is located on the right side of the longitudinal portion 120 in FIG. 2, and the avoidance portion 130 is a fold line bent outwardly, that is, the avoidance portion 130 is formed by a plurality of line segments with different angles, in the present embodiment, the avoidance portion 130 is constituted by three line segments, which are a first outward diagonal section 131, a connecting section 132 and a second outward diagonal section 133, respectively, one ends of the first outward diagonal section 131 and the second outward diagonal section 133 are connected to the longitudinal portion 120, respectively, and the other ends of the first outward diagonal section 131 and the second outward diagonal section 133 is connected to both ends of the connecting section 132. In the present embodiment, the first outward diagonal section 131, the connecting section 132 and the second outward diagonal section 133 are straight lines, wherein the connecting section 132 is parallel to the longitudinal portion. In the present embodiment, the number of the avoidance portions 130 is the same as the number of the dummy scanning lines DS1, . . . , DSm, both are M, and the number of the longitudinal portion 120 is M+1.

In the present embodiment, with projection in the horizontal plane, the shortest distance between the avoidance portion of the outer dummy data line DDn and the end portion of the corresponding scanning line is in the range of 5 μm to 15 μm, that is, the shortest distance between the projection of avoidance portion 130 in the horizontal plane and the projection of the end portion of the corresponding scanning line in the horizontal plane is in the range of 5 μm to 15 μm, for example, 5 μm, 6 μm, 7 μm, 8 μm, 9 μm, 10 μm, 11 μm, 12 μm, 13 μm, 14 μm, and 15 μm. When the shortest distance between the avoidance portion of the outer dummy data line DDn and the end portion of the corresponding scanning line is less than 5 μm, it is relatively easy to cause short with the outer dummy data line when the end portions of the corresponding scanning lines are subjected to electrostatic discharge, thus the effect of improving the short is not very good; when the shortest distance between the avoidance portion of the outer dummy data line DDn and the end portion of the corresponding scanning line is larger than 15 μm, although the effect of improving the short between the both is better, however, due to the limitation of the peripheral area of the flat panel display device, it is bound to squeeze the position of other circuits or electric components. Preferably, the shortest distance between the avoidance portions 130 of the outer dummy data line DDn and the end portion of he corresponding scanning line ranges from 7 μm to 10 μm.

In this embodiment, an insulating layer is disposed between the dummy scanning lines DS1, DSm and the dummy data lines DD1, . . . , And DDn. The insulating layer is an insulating layer made of $SiN_x$ or Or an insulating layer made of $SiN_x$ and $SiO_2$.

In the present embodiment, the thin film transistor 110 may be a LTPS-based thin film transistor or a conventional thin film transistor. When the thin film transistor 110 is the LTPS-based thin film transistor, since the fabricating process of the LTPS-based thin film transistor is complicated, the static electricity is easily increased, so that the distance between the avoidance portions 130 of the outer dummy data line DDn and the end portion of the corresponding scanning line can be appropriately increased.

An embodiment of the present invention further provides a driving circuit of the flat panel display device, wherein the driving circuit includes a charging circuit located in the active area and the dummy circuit located in the peripheral area.

The Second Embodiment

Figure 3:
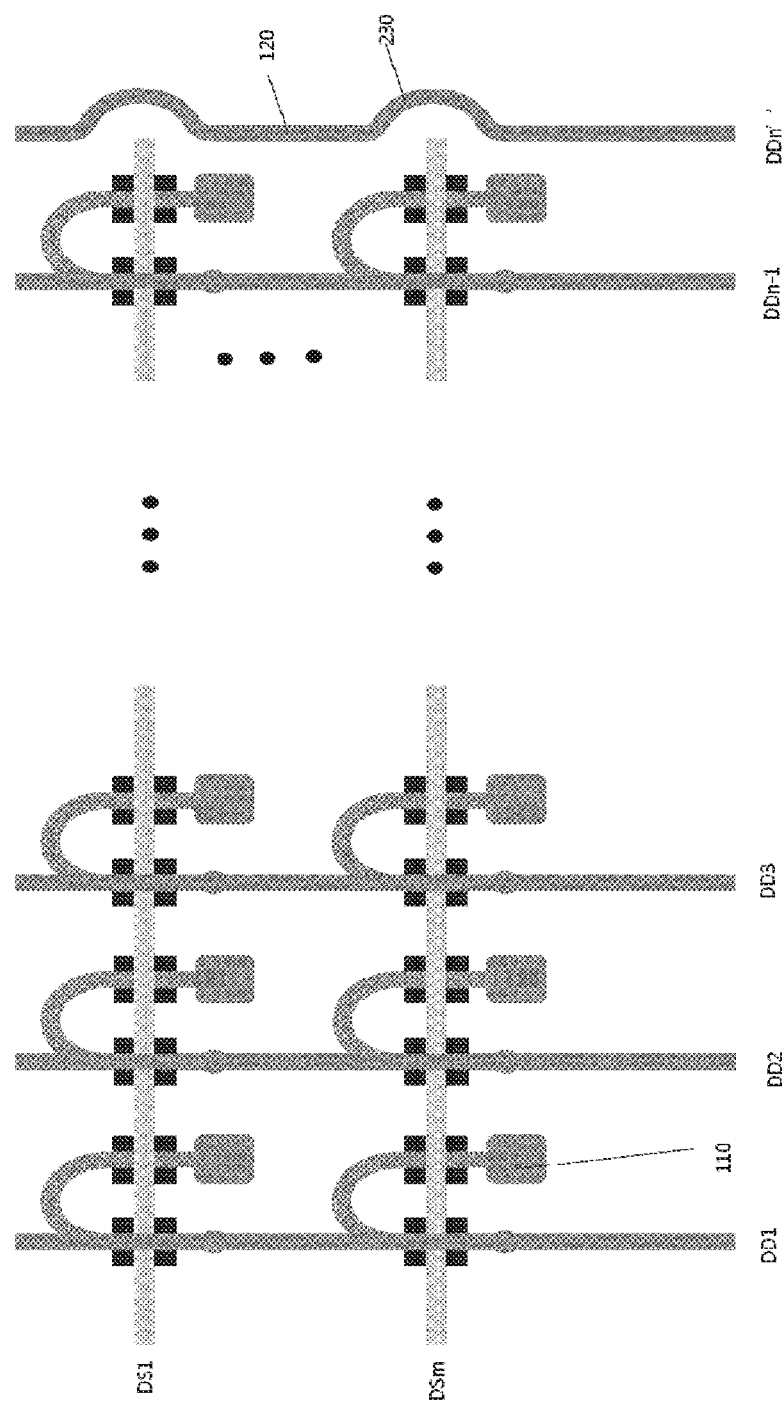
FIG. 3 is a schematic diagram of the dummy circuit of a flat panel display device according to a second embodiment of the present invention.

FIG. 3 is a schematic diagram of a dummy circuit of a flat panel display device according to a second embodiment of the present invention. The schematic diagram of FIG. 3 is similar to the schematic diagram of FIG. 2, so that the same original symbol represents the same components. The main difference between the present embodiment and the first embodiment is the shape of the avoidance portion.

Referring to FIG. 3, in the present embodiment, the outer dummy data line DDn" includes a longitudinal portion 120 and an avoidance portion 230, the longitudinal portion 120 is connected to the avoidance portion 230, and the avoidance portion 230 is located on the outer side of the longitudinal portion 120. In the present embodiment, the avoidance portion 230 is a curved portion bent outwardly. Specifically, the center line of the projection of the avoidance portion 230 in the horizontal plane is an arc, and the arc protrudes outwardly (rightwardly). In the present embodiment, the center line of the projection of the avoidance portion 230 in the horizontal plane is a circular arc. But the present invention is not limited thereto, in other embodiments of the present invention; the center line of the projection of the avoidance portion in the horizontal plane may be other outwardly convex curve or a curved curve which is convex outwardly as a whole.

It should be noted that the various embodiments in the present specification are described in a progressive manner, each of which focuses on the differences from the other embodiments, and the same similar parts between the various embodiments refer to each other can. For the device embodiment, since it is substantially similar to the method embodiment, the description is relatively simple, and the relevant part is described in part of the method embodiment.

The present invention has the following advantages by the description of the above embodiments:

Since the plurality of the dummy data lines includes an outermost outer dummy data line, the outer dummy data line corresponding to at least one end portion of the of the dummy scanning line is outwardly avoidance disposed to make the projections of the both are staggered. Thus, there is a gap between the outer dummy data line and the corresponding dummy scanning line at the horizontal plane, and there is no overlap between the two, even if a large amount of static electricity is accumulated at the end portion of the corresponding dummy scanning line, the outer dummy data line and the corresponding dummy scanning line are not easy to be shorted, so that it is not easy to cause an abnormality such as a vertical bright line or a dark display.

The foregoing contents are detailed description of the disclosure in conjunction with specific preferred embodiments and concrete embodiments of the disclosure are not limited to these descriptions. For the person skilled in the art of the disclosure, without departing from the concept of the disclosure, simple deductions or substitutions can be made and should be included in the protection scope of the application.

What is claimed is:

1. A dummy circuit of a flat panel display device, comprising:
   a plurality of dummy scanning lines extending in a row direction and separated from each other;
   a plurality of dummy data lines extending in a column direction and separated from each other, the dummy data lines comprising an outer dummy data line in the outermost side; the dummy scanning lines intersecting with the dummy data lines to form a plurality of dummy pixel regions, dummy pixel electrodes provided in the dummy pixel regions;
   a plurality of thin film transistors connecting the pixel electrode to the corresponding dummy scanning lines and the dummy data lines; and
   wherein the outer dummy data line corresponding to at least one end portion of the of the dummy scanning line is outwardly avoidance disposed to make the projections of the both staggered,
   wherein the outer dummy data line comprises a longitudinal portion and an avoidance portion, the longitudinal portion is connected to the avoidance portion, and the avoidance portion is located on the outer side of the longitudinal portion,
       wherein with projection in the horizontal plane, a shortest distance between the avoidance portion and the end portion of the corresponding scanning line is in the range of 5 µm to 15 µm.

2. The dummy circuit of the flat panel display device according to claim 1, wherein the avoidance portion is a fold line bent outwardly.

3. The dummy circuit of the flat panel display device according to claim 1 wherein the avoidance portion is a curved portion bent outwardly.

4. The dummy circuit of the flat panel display device according to claim 1, wherein the outer dummy data line corresponding to all of end portions of the dummy scanning lines are outwardly avoidance disposed.

5. The dummy circuit of the flat panel display device according to claim 1, wherein the outer dummy data line corresponding to all of end portions of the dummy scanning lines are outwardly avoidance disposed.

6. The dummy circuit of the flat panel display device according to claim 1, wherein an insulating layer is disposed between the dummy scanning lines and the dummy data lines.

7. The dummy circuit of the flat panel display device according to claim 1, wherein end portions of the dummy scanning lines are pointed ends.

8. The dummy circuit of the flat panel display device according to claim 1, wherein the thin film transistors are low-temperature-polycrystalline-silicon (LTPS) based thin film transistor.

9. A driving circuit of a flat panel display device, comprising a dummy circuit of a flat panel display device, the dummy circuit of the flat panel display device comprising:
   a plurality of dummy scanning lines extending in a row direction and separated from each other;
   a plurality of dummy data lines extending in a column direction and separated from each other, the dummy data lines comprising an outer dummy data line in the outermost side; the dummy scanning lines intersecting with the dummy data lines to form a plurality of dummy pixel regions, dummy pixel electrodes provided in the dummy pixel regions;
   a plurality of thin film transistors connecting the pixel electrode to the corresponding dummy scanning lines and the dummy data lines; and
   wherein the outer dummy data line corresponding to at least one end portion of the of the dummy scanning line is outwardly avoidance disposed to make the projections of the both staggered,
   wherein the outer dummy data line comprises a longitudinal portion and an avoidance portion, the longitudinal portion is connected to the avoidance portion, and the avoidance portion is located on the outer side of the longitudinal portion,
       wherein with projection in the horizontal plane, a shortest distance between the avoidance portion and the end portion of the corresponding scanning line is in the range of 5 µm to 15 µm.

10. The driving circuit of the flat panel display device according to claim 9, wherein the avoidance portion is a fold line bent outwardly.

11. The driving circuit of the flat panel display device according to claim 9, wherein the avoidance portion is a curved portion bent outwardly.

12. The driving circuit of the flat panel display device according to claim 9, wherein the outer dummy data line corresponding to all of end portions of the dummy scanning lines are outwardly avoidance disposed.

13. The driving circuit of the flat panel display device according to claim 9, wherein the outer dummy data line corresponding to all of end portions of the dummy scanning lines are outwardly avoidance disposed.

14. The driving circuit of the flat panel display device according to claim 9, wherein an insulating layer is disposed between the dummy scanning lines and he dummy data lines.

15. The driving circuit of the flat panel display device according to claim 9, wherein end portions of the dummy scanning lines are pointed ends.

16. The driving circuit of the flat panel display device according to claim 9, wherein the thin film transistors are low-temperature-polycrystalline-silicon (LTPS) based thin film transistor.

* * * * *